Oct. 5, 1943.                W. L. WOOLF                2,330,855
              METHOD OF SPLICING ORGANIC PLASTIC FILM
                        Filed July 19, 1940

INVENTOR
WILLIAM L. WOOLF
BY
Geo. M. Dowe
ATTORNEY

Patented Oct. 5, 1943

2,330,855

UNITED STATES PATENT OFFICE 2,330,855

METHOD OF SPLICING ORGANIC PLASTIC FILM

William L. Woolf, Bayside, Long Island, N. Y., assignor, by mesne assignments, to Recordgraph Corporation, New York, N. Y., a corporation of Delaware Application July 19, 1940, Serial No. 346,261

2 Claims. (Cl. 154—42)

This invention relates to a method of splicing organic plastic film. It is adapted more particularly to films bearing a sound record or intended to bear such a record.

One of the objects of the invention is to produce a splice which is free from noise and other mechanical troubles. Splices for films heretofore proposed, insofar as I am aware, present two major difficulties. When a sound film is reproduced by variations in light through the agency of a photo-electric cell, the splice makes a noise as it passes the gate in the reproducing apparatus. This noise is the result of the difference in light transmitting properties between the splice and unspliced areas. In the case of a stylus, the noise is caused by a sudden change in the thickness of the film. Other causes of either undesirable noise or noticeable change in sound characteristics in splices as formerly used are due to variations in the physical properties of the film at the splice, such as: width, hardness, elasticity, plasticity, viscosity and molecular structure.

A second difficulty found in the ordinary splice is its tendency to break. Variations in thickness, width or hardness or any other discontinuities resulting in a steep gradient in physical characteristics, cause an abnormal strain to appear at the margin of such discontinuity when the film is stressed due to any cause, such as passing over a roller, or through any mechanical driving device. In a lapped splice, for instance, the lapped area becomes stiffer than the remaining body of the film and does not readily conform to the rollers which guide the film and therefore tends to remain unbent, throwing an unusual high angle of bend on the film at the margin of the discontinuity in thickness.

Further objects of the invention are to produce a splice which does not break and which is so minute in the spliced area that losses of program are negligible.

With the foregoing objects in view, a feature of the invention relates to a butt slice, the ends of the film being united by material chemically identical, as nearly as possible, with the body of the film.

In the preferred embodiment of the invention, I employ a plurality or series of solvents, the volatility of each differing from that of the others. The most volatile solvents evaporate first, making a quick setting splice of sufficient strength to permit the necessary handling without danger of breaking. The remaining solvents evaporate with progressively increasing time lag, setting up in the splice region a somewhat continuous state of healing without sudden or violent internal changes and stresses which might tend to weaken the splice and distort the film. The rapid evaporation of the first solvent occurs while the splice is sufficiently fluid to avoid dangerous internal stresses and tendency to rupture. As the fluidity of the mass decreases, the rate of evaporation of the solvents gradually subsides, permitting an orderly escape of the gases at a diminishing rate as the mass solidifies, thus avoiding undue internal stresses which would weaken and warp the film thus leaving a strong firm and flat joint.

When the solvents have nearly all evaporated, but not entirely so, the joint may be subjected to heat and pressure in a suitable die, where the small amount of solvent present acts as a plasticiser, causing the material affected to flow with much less heat and less pressure than the unplasticized material of the film. Heat and pressure are not applied, however, until the quantity of solvent remaining is too small to weaken the structure by a too rapid escapement of gases after the mass has become less plastic. The time required between the application of the splicing compound to the film ends and the application of heat and pressure to the splice will vary with different solvents and films but may be readily determined for any given condition by making a few test splices. If the heat is applied too early in the process of curing, the splice blushes or becomes milky. The splice may be heat and pressure treated after substantially all the solvent has evaporated, but more intense heat is necessary to achieve the desired result, particularly if the film has only a small amount of plasticizer incorporated into its composition.

To make the splice as small as practical, the ends of the film to be spliced are separated about $\frac{1}{64}$ to $\frac{1}{32}$ of an inch and the splicing compound is applied in the narrow crevice between the ends. The ends are then brought together, butting against each other, thus diminishing the width of the splice to at most a few ten thousandths of an inch. The ends may be cut in any convenient manner to allow the proper distance between the two perforations on either side of the splice when the cut ends are butted together.

One method of cutting the film such that when the butt splice is made the perforations on either side of the splice will be separated by the same distance as that between the perforations in the body of the film, is first to superimpose two pairs of perforations over each other. This may be done by matching with the eye or by providing pegs of the proper size and spacing so that two pairs of the film perforations fit over the pegs, one pair superimposed over the other. The film may then be cut across between the two pairs of perforations. If the slitting knife is held substantially perpendicular to the surface of the film, the two ends remaining on the body of the film will butt against each other and the two perforations remaining will be properly spaced apart.

After cutting the film as above outlined, further steps in the process of making the splice are illustrated more or less diagrammatically in the accompanying drawing, in which.

Figure 1:
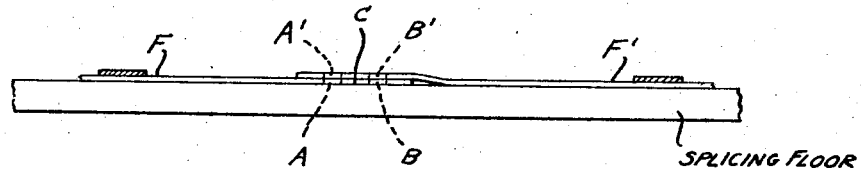
Figure 1 is an elevation of a portion of the film positioned ready to be cut.

In Figure 1 the two pieces of film, F and F' are set up to be cut as above described with sprocket holes A and A' superimposed over each other and B and B' also superimposed to match each other. The film is cut at C, the portions of the film bearing A' and B respectively are eliminated and B' then occupies the space formerly occupied by B, leaving the two ends butting together with the perforations A and B' properly spaced. This cut may conveniently be made with a razor blade with the film on a glass plate. The line C on which the film is cut may be a straight line perpendicular to the edges of the film but this requirement is not essential. The film may be cut on a curved line or on a line oblique to the edges of the film. It is preferable, however, that the cut line be as far as possible from the perforations as midway between them in order that when the splice is pressed the perforations are not deformed.

Figure 2:
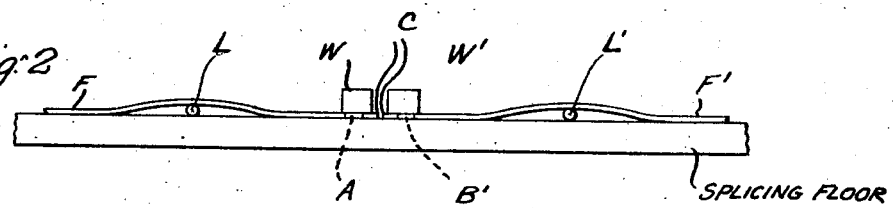
Figure 2 is a similar view but showing the ends of the splice slightly separated.
Figure 3:
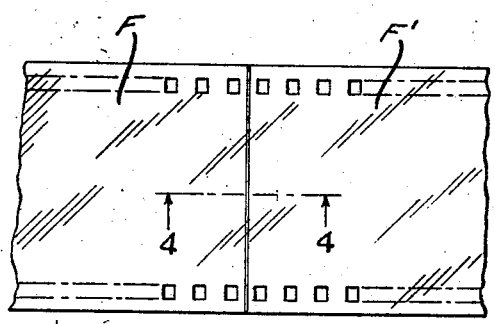
Figure 3 is a top plan view of the film after the splice has been completed.
Figure 4:
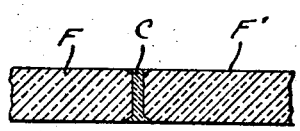
Figure 4 is a section on the line 4—4 of Figure 3.

The ends of the film are next separated a short distance. A convenient way of doing this by hand is shown in Figure 2. Under each piece of film is placed a small object of uniform cross section, such as a metal rod of about 1/16" diameter as shown at L and L' respectively and weights are placed on either end of the film as shown at W and W'. This leaves the two ends separated by a very small distance as shown.

A small glass or metal tube with a capillary orifice of about 1 millimeter internal diameter—such as a hypodermic needle cut squarely off at the orifice end—is filled with the proper solution and the end of the capillary drawn through the crevice between the two ends of the film, thereby depositing therein a charge of the splicing compound. The amount of the charge which will flow is influenced by the fluidity of the solution, the size of the orifice and the speed with which the tube or needle is drawn through the crevice. It is important that neither too much or too little of the splicing compound be deposited. If too little is deposited there is not enough solvent present to dissolve the film ends and flow them together. If too much is used, it overflows when the film ends are brought together and attacks the film at points slightly remote from the splice. After a few attempts the operator becomes skilled in depositing the proper amount to just fill the crevice when the ends are brought together with a very minor amount of overflow. L and L' are next removed from under the film and the two ends of the film forced together before the solution has time to set.

The material used to form the splice should preferably consist of a portion of the film to be spliced dissolved in a proper solvent. It will be apparent that a material chemically similar to the film material may also be used. By this means solutions may be made up in advance. In order to be sure, however, that the material dissolved is similar to the material of the film, it is safe to dissolve a portion of the film to be spliced in the solvent and to use this in making the splicing compound.

I have found a suitable solvent to be a mixture of ethylene dichloride and methanol, 85% of the former and 15% of the latter resulting in a satisfactory joint. The ethylene dichloride evaporates quickly, leaving the splice strong enough for handling in a few moments. The methanol evaporates more slowly. If the splice is not dried too rapidly, such as by the application of heat at an early stage, this splice becomes very strong when dry. Another excellent solvent is made from 75% ethylene dichloride, 15% methanol and 10% ethyl lactate, 4 or 5% of ethyl acetate may also be added as a solvent, the latter being a still less volatile solvent. The ethyl lactate is not only a solvent but serves very well as a plasticizer. Suitable solvent compounds may be concocted from a graded series of the ketones or the esters. Evaporation by the solvents of variable volatility permits the major portion of the more volatile solvents to evaporate while the other solvents remain in the body and through their action the affected part remains sufficiently plastic to withstand warpage. Under physical control of the unaffected parts, the more fluid part yields to its external rather than its internal stresses and remains flat thus overcoming the tendency to warp, which has defeated earlier attempts to make a successful splice.

It is important that the splicing compound contain the proper amount of the film or chemically similar material in the solution. If the splicing compound is too fluid capillary action causes it to run under the film ends. The compound is thus removed from the region of the splice and its action on the considerable portion of the film thus brought under the influence of the solvent causes warpage and greatly increases the area which has been subject to the splicing action. If the solution is too concentrated, on the other hand, it is found to be too viscous to allow suitable and necessary solvent action on the ends of the film to be joined. If the splicing material, however, is of the proper consistency, it fills the crevice between the film ends without running under the film ends and the surface tension rounds and smooths the surface, leaving a smooth splice. 5% film body and 95% of the solvent has proven to be an excellent splicing compound.

After the solution is placed in the crevice between the film ends, L and L' are removed and the film ends brought together. It is preferable that the film be resting on a smooth surface. It is essential that the material on which the film rests resists attack by the splicing solution. Glass is very satisfactory. The same glass on which the film was cut may remain as the base for splicing. A small portion of the splicing solution is extruded from the space between the film ends when the ends are brought together. This material forms against the film base on the under side and if the film base is glass or other smooth material, a smooth surface results. If the proper amount of solution has been placed between the film ends, a very little will be extruded from the space between the ends when they are brought together. This material may rise and result in a fine hair-like protrusion from the splice so small as to be almost imperceptible and too small to cause serious noise in passing the stylus. If the splicing compound is slightly too viscous, the surplus material may assume the form of a series of spheres at the junction of the film ends.

The solvent between the film ends first attacks the film ends carrying a portion of their substance into solution and merging it with the material originally dissolved by the compound but as the solvent evaporate, they redeposit the material held in solution, leaving such a gradual gradation from the material injected and deposited between the ends to the parent material of the film that any change in physical properties are undiscernable by audible tests.

Before cutting preparatory to splicing it is well to fasten the film F and F' to a base a few inches removed from the ends. This may be done by placing the film perforations over suitable pins, properly spaced, by means of a clamp, by means of a closely fitting form, by means of taping the film to the base or any other suitable means. If the film ends, after having been properly spaced with respect to each other, are rigidly attached by any of the above or other satisfactory means to the splicing base, the perforations will properly align and the ends will butt together after L and L' are removed.

A few moments after the splicing compound has been added and the ends brought together, the splice is strong enough to remove and is left to dry. After the splice is dry it may be further improved by pressing between two smooth hot plates. The plates should be parallel and very highly polished as the film surface will conform to the surface of the plates. While it is to be understood that I am not so limited, I have obtained excellent results by using plates under pressure from 150 to 1000 lbs. per square inch at temperatures up to about 150 degrees centigrade.

It is desirable to confine the heat to the very narrow area of the splice. The plates, however, should extend beyond the heated area and be cool at the ends where the film comes out from between the plates in order to avoid a kink in the film at the plate ends. In some instances it has been found advisable to cool the pressure plates before removing the film, the result being that when removed the film is firm and free from warpage.

That portion of the film consisting of the splice when made in accordance with this method is almost identical in all its physical characteristics with the unspliced portion of the film. It lasts equally long under wear and makes no unusual noise in passing the gate or stylus of a sound reproducing instrument.

What I claim is:

1. The method of producing a splice in an organic plastic sound record film which consists in cutting the ends of the film to be joined along a plane substantially at right angles to the film surface, bringing the ends into slightly spaced relation, depositing at the juncture a splicing compound composed of material of the film or like material dissolved in a plurality of solvents of different volatility, whereby continuous evaporation at a decreasing rate takes place as the mass of the film solidifies, bringing the ends into abutting relation thereby causing some of the joining material to be forced out beyond the film surfaces whereby subsequent evaporation of the slower evaporating solvents causes the extruded portions to be diminished.

2. The method of producing a splice in an organic plastic sound record film which consists in cutting the ends of the film to be joined along a plane substantially at right angles to the film surface, bringing the ends into slightly spaced relation, depositing at the juncture a splicing compound composed of material of the film or like material dissolved in a plurality of solvents of different volatility, whereby continuous evaporation at a decreasing rate takes place as the mass of the film solidifies, bringing the ends into abutting relation thereby causing some of the joining material to be forced out beyond the film surfaces whereby subsequent evaporation of the slower evaporating solvents causes the extruded portions to be diminished and subsequently applying heat and pressure to the spliced area.

WILLIAM L. WOOLF.